(12) United States Patent
Shu et al.

(10) Patent No.: US 12,176,751 B2
(45) Date of Patent: Dec. 24, 2024

(54) NON-CURRENT EQUALIZATION UPS APPARATUS, CURRENT DISTRIBUTION METHOD, AND PARALLEL UPS SYSTEM

(71) Applicant: Huawei Digital Power Technologies Co., Ltd., Guangdong (CN)

(72) Inventors: Zhou Shu, Dongguan (CN); Chuntao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 18/158,910

(22) Filed: Jan. 24, 2023

(65) Prior Publication Data
US 2023/0187966 A1    Jun. 15, 2023

Related U.S. Application Data

(63) Continuation of application No. PCT/CN2020/104700, filed on Jul. 25, 2020.

(51) Int. Cl.
*H02J 9/06* (2006.01)
*H02J 7/00* (2006.01)

(52) U.S. Cl.
CPC .......... *H02J 9/061* (2013.01); *H02J 7/00032* (2020.01); *H02J 7/0013* (2013.01); *H02J 7/0048* (2020.01); *H02J 7/0063* (2013.01); *H02J 7/00712* (2020.01); *H02J 9/062* (2013.01)

(58) Field of Classification Search
CPC .... H02J 9/062; H02J 9/06; H02J 9/061; H02J 7/0013; H02J 7/0063; H02J 7/0048; H02J 7/00032
See application file for complete search history.

(56) References Cited

U.S. PATENT DOCUMENTS

| 2007/0007825 A1* | 1/2007 | Heber | H02M 7/493 307/67 |
| 2012/0086269 A1* | 4/2012 | Nakano | H02J 9/062 307/23 |

(Continued)

FOREIGN PATENT DOCUMENTS

| CN | 1423389 A | 6/2003 |
| CN | 110138051 A | 8/2019 |

OTHER PUBLICATIONS

Choi, Bong-Yeon, et al. "Battery balancing algorithm for parallel operation of single phase UPS inverters." 2014 IEEE Conference and Expo Transportation Electrification Asia-Pacific (ITEC Asia-Pacific). IEEE, 2014. (Year: 2014).*

*Primary Examiner* — Ryan Johnson

(57) ABSTRACT

This application discloses a non-current equalization UPS apparatus, a current distribution method, and a parallel UPS system. The current distribution method may be applied to any UPS apparatus in a parallel UPS system. A current proportion of a first current output by the any UPS apparatus in a total output current of the parallel UPS system is positively related to a capacity proportion of an available battery capacity of a battery string correspondingly connected to the any UPS apparatus in a total available battery capacity of the parallel UPS system. Therefore, a system backup time of the parallel UPS system can be prolonged, and resource utilization of a battery string with a large available battery capacity can be improved.

16 Claims, 4 Drawing Sheets

(56) References Cited

U.S. PATENT DOCUMENTS

2014/0210271 A1* 7/2014 Toyoda ................... H02J 9/061
 307/66
2015/0061392 A1* 3/2015 Berard ..................... H02J 3/46
 307/52
2017/0308142 A1* 10/2017 Altobelli ............... H02J 7/0013

* cited by examiner

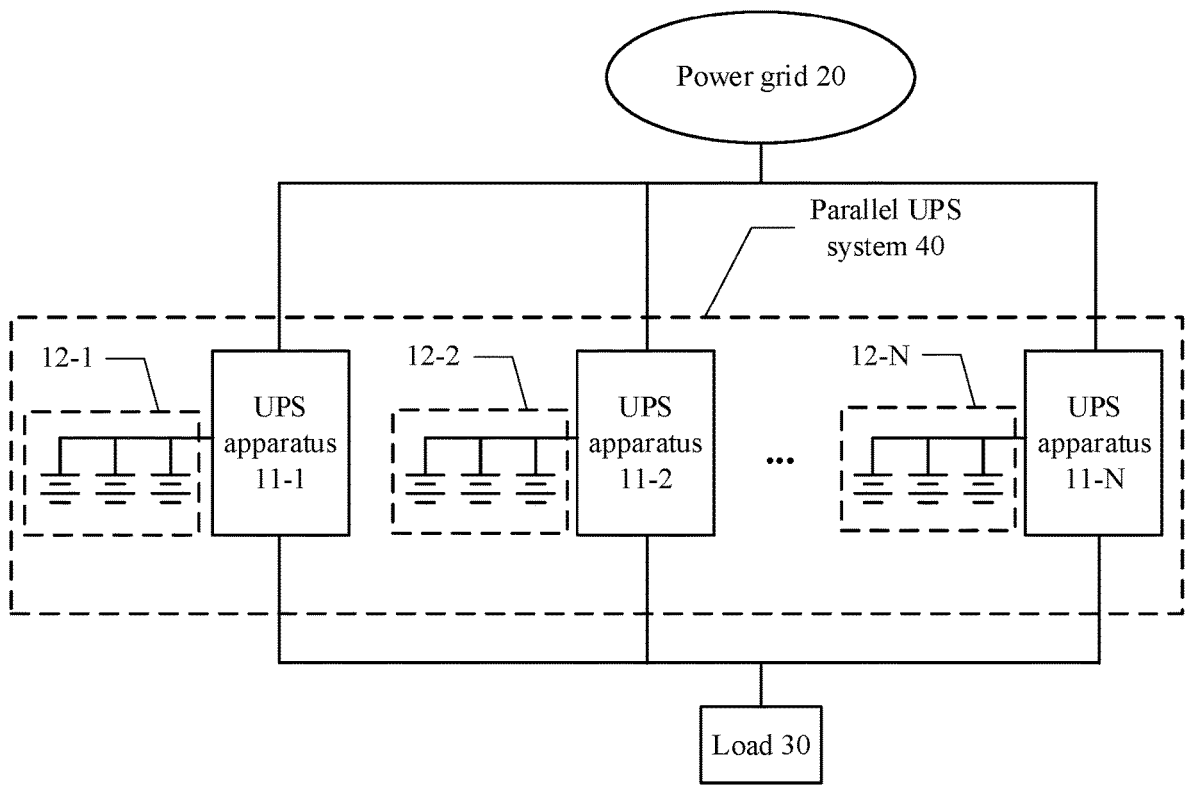

FIG. 2

| When each of a plurality of UPS apparatuses supplies power by using a battery string correspondingly connected to the UPS apparatus, obtain a capacity proportion of an available battery capacity of a battery string 12-1 in a total available battery capacity of a plurality of battery strings | S301 |

| Output a first current to a load based on the capacity proportion, where a current proportion of the first current in a total output current of a parallel UPS system is positively related to the capacity proportion | S302 |

FIG. 3

NON-CURRENT EQUALIZATION UPS APPARATUS, CURRENT DISTRIBUTION METHOD, AND PARALLEL UPS SYSTEM

CROSS-REFERENCE TO RELATED APPLICATIONS

This application is a continuation of International Application No. PCT/CN2020/104700, filed on Jul. 25, 2020, the disclosure of which is hereby incorporated by reference in its entirety.

TECHNICAL FIELD

This application relates to the field of UPS technologies, and in particular, to a non-current equalization UPS apparatus, a current distribution method, and a parallel UPS system.

BACKGROUND

An uninterruptible power system (UPS) is a system capable of substituting for a power grid to uninterruptedly supply power to a load device to maintain normal operation of the load device when the power grid fails (for example, a power failure, undervoltage, interference, or a surge occurs). Specifically, the UPS system mainly includes a UPS apparatus and a battery string. The UPS apparatus is separately connected to the power grid, the load device, and the battery string. The UPS apparatus may monitor an operating status of the power grid. When the power grid operates normally, the UPS apparatus may supply power to the load device by using electric energy supplied by the power grid. When the power grid fails, the UPS apparatus may control the battery string to discharge, and continue to supply power to the load device by using electric energy output by the battery string.

Generally, an output power of a single UPS apparatus is limited. To drive a high-power load device, a plurality of UPS apparatuses usually need to be disposed in the UPS system. The plurality of UPS apparatuses may supply power to the load device simultaneously. In this case, the UPS system may also be referred to as a parallel UPS system. In a common parallel UPS system, a plurality of battery strings may be further disposed. The plurality of battery strings are connected to the plurality of UPS apparatuses in the parallel UPS system in a one-to-one correspondence.

However, in the parallel UPS system, a system backup time (a period of time for continuously supplying power to the load device by using the battery strings) of the parallel UPS system is mainly determined by a battery string with a smallest available battery capacity in the plurality of battery strings. If available battery capacities of the plurality of battery strings vary greatly, a resource waste is caused to a battery string with a large available battery capacity, and further extension of the system backup time is also limited. Therefore, further research is required for the current parallel UPS system.

SUMMARY

Embodiments of this application provide a non-current equalization UPS apparatus, a current distribution method, and a parallel UPS system, to extend a system backup time of a parallel UPS system and improve resource utilization of a battery string with a large available battery capacity.

According to a first aspect, an embodiment of this application provides a current distribution method. The current distribution method may be used in a first UPS apparatus in a parallel UPS system. The parallel UPS system includes a plurality of UPS apparatuses and a plurality of battery strings, and the plurality of UPS apparatuses are correspondingly connected to the plurality of battery strings. The first UPS apparatus may be any one of the plurality of UPS apparatuses. The current distribution method provided in this embodiment of this application mainly includes: The first UPS apparatus may obtain a capacity proportion of an available battery capacity of a first battery string in a total available battery capacity of the plurality of battery strings when each of the plurality of UPS apparatuses supplies power by using a battery string correspondingly connected to the UPS apparatus. The first UPS apparatus may further control, based on the capacity proportion, a first current to be output to a load. A current proportion of the first current in a total output current of the parallel UPS system is positively related to the capacity proportion.

It should be noted that, at any time point at which each of the plurality of UPS apparatuses supplies power by using a battery string correspondingly connected to the UPS apparatus, the first UPS apparatus may perform the current distribution method provided in this embodiment of this application. The any time point may be an initial time point at which each of the plurality of UPS apparatuses starts to supply power by using a battery string correspondingly connected to the UPS apparatus, or may be any time point after the initial time point in a period during which each of the plurality of UPS apparatuses supplies power by using a battery string correspondingly connected to the UPS apparatus.

The available battery capacity of the first battery string may be understood as a battery capacity of the first battery string at the any time point (or at a time point close to the any time point). Similarly, the total available battery capacity of the plurality of battery strings may also be understood as a sum of available battery capacities of the plurality of battery strings at the any time point (or at a time point close to the any time point).

That the current proportion of the first current in the total output current of the parallel UPS system is positively related to the capacity proportion may be understood as that a larger capacity proportion of the first battery string indicates a larger current proportion of the first current output by the first UPS apparatus in the total output current of the parallel UPS system. On the contrary, a smaller capacity proportion of the first battery string indicates a smaller current proportion of the first current output by the first UPS apparatus in the total output current of the parallel UPS system.

Therefore, with the current distribution method provided in this embodiment of this application, current distribution may be performed on each UPS apparatus based on an available battery capacity of a battery string correspondingly connected to the UPS apparatus. Therefore, a UPS apparatus correspondingly connected to a battery string with a small available battery capacity may output a small output current, that is, have a small output power. Therefore, the battery string correspondingly connected to the UPS apparatus may also have a small output power, thereby extending a system backup time of the parallel UPS system. A UPS apparatus correspondingly connected to a battery string with a large available battery capacity may output a large output current, that is, have a large output power. Therefore, the battery string correspondingly connected to the UPS apparatus may also have a large output power, thereby maintaining the total output current of the parallel UPS system and fully utilizing resources of the battery string with a large available battery capacity.

For example, when controlling the first current to be output to the load based on the capacity proportion, the first UPS apparatus may calculate, based on the capacity proportion and the total output current, a first current value corresponding to the first UPS apparatus. The first current value is equal to a product of the capacity proportion and a current value of the total output current. Further, the first UPS apparatus may control, based on the first current value, the first current to be output.

When the first current value is less than a current value of a rated output current of the first UPS apparatus, the first UPS apparatus may control the current value of the first current to be a second current value, where the second current value is not greater than the current value of the rated output current and is not less than the first current value. When the first current value is the current value of the rated output current, the first UPS apparatus may control the current value of the first current to be the current value of the rated output current. When the first current value is greater than the current value of the rated output current of the first UPS apparatus, the first UPS apparatus may control the current value of the first current to be a third current value, where the third current value is not greater than the current value of the rated output current of the first UPS apparatus.

Compared with a current distribution solution based on current equalization, with the foregoing solution, a system backup time of the parallel UPS system can also be prolonged, and resource utilization of a battery string with a large available battery capacity can also be improved. In addition, it can be further ensured that the first current output by the first UPS apparatus does not exceed the rated output current of the first UPS apparatus, thereby helping ensure safety of the first UPS apparatus.

In view of this, to maintain the total output current of the parallel UPS system, when the first current value is greater than the current value of the rated output current of the first UPS apparatus, the first UPS apparatus may further send indication information to a second UPS apparatus. The indication information may indicate a difference obtained by subtracting the third current value from the first current value. The second UPS apparatus may be any UPS apparatus other than the first UPS apparatus in the parallel UPS system.

After receiving the indication information, the second UPS apparatus may determine a second current value of the second UPS apparatus based on a sum of the difference indicated by the indication information and a first current value of the second UPS apparatus. The second UPS apparatus may further control a current value of a first current of the second UPS apparatus to be the second current value. Therefore, in this implementation, the total output current of the parallel UPS system can be kept unchanged while safety of the first UPS apparatus is ensured.

To maintain the total output current of the parallel UPS system, when the first current value is less than the current value of the rated output current of the first UPS apparatus, after receiving indication information sent by any other UPS apparatus, the first UPS apparatus may further control, based on the received indication information, the current value of the first current of the first UPS apparatus to be a second current value, where the second current value is a sum of the first current value and a difference indicated by the indication information.

It can be understood that the first UPS apparatus may alternatively increase the current value of the first current based on the indication information sent by the any other UPS apparatus, that is, control the current value of the first current to be the second current value. The second current value may be the sum of the first current value of the first UPS apparatus and the difference indicated by the indication information. Therefore, the total output current of the parallel UPS system can be kept unchanged while safety of the any other UPS apparatus is ensured.

In this embodiment of this application, when obtaining the capacity proportion of the first battery string, the first UPS apparatus may send first query information to another UPS apparatus different from the first UPS apparatus in the plurality of UPS apparatuses. The first query information may indicate the another UPS apparatus to feed back an available battery capacity of a battery string correspondingly connected to the another UPS apparatus. The first UPS apparatus may further obtain the capacity proportion based on the available battery capacity of the first battery string and the available battery capacity of the battery string correspondingly connected to the another UPS apparatus.

It can be understood that the first UPS apparatus may also receive first query information sent by another UPS apparatus. For example, after receiving first query information sent by any other UPS apparatus different from the first UPS apparatus, the first UPS apparatus may further feed back the available battery capacity of the first battery string to the any other UPS apparatus that sends the first query information.

In an embodiment, after the first battery string starts to be used to supply power, the first UPS apparatus may further send second query information to another UPS apparatus different from the first UPS apparatus, where the second query information may indicate the another UPS apparatus to feed back a current power supply status. When all other UPS apparatuses supply power by using battery strings, the first UPS apparatus may determine that each of the plurality of UPS apparatuses supplies power by using a battery string correspondingly connected to the UPS apparatus.

Each UPS apparatus in the parallel UPS system may switch to a battery string for power supply when a power failure occurs on a power grid. However, because factors causing the power failure on the power grid vary, in some scenarios, the plurality of UPS apparatuses in the parallel UPS system do not synchronously switch to battery strings for power supply. In view of this, after starting to supply power by using the battery string, the first UPS apparatus further needs to first determine whether a current time point is an initial time point. When the current time point is the initial time point, the first UPS apparatus then obtains the capacity proportion of the first battery string. With the method provided in this embodiment of this application, the first UPS apparatus may separately send second query information to other UPS apparatuses, to determine whether the current time point is the initial time point.

In addition, when at least one other UPS apparatus does not supply power by using a battery string correspondingly connected to the at least one other UPS apparatus, the first UPS apparatus may further control a second current to be output to the load. The second current is not greater than the rated output current of the first UPS apparatus. When at least one other UPS apparatus does not supply power by using a battery string correspondingly connected to the at least one other UPS apparatus, the current time point is not the initial time point. In this case, the first UPS apparatus may output the second current. A current value of the second current may be equal to a current value of an output current when the first UPS apparatus supplies power by using the power grid, or the current value of the second current may be less than the current value of the output current when the first UPS apparatus supplies power by using the power grid, to extend a backup time of the first UPS apparatus.

It can be understood that the first UPS apparatus may alternatively receive second query information sent by another UPS apparatus. For example, after receiving second query information sent by any other UPS apparatus different from the first UPS apparatus, the first UPS apparatus may feed back a current power supply status to the any other UPS apparatus that sends the second query information.

According to a second aspect, an embodiment of this application further provides a non-current equalization UPS apparatus. The non-current equalization UPS apparatus may be used in a parallel UPS system. The parallel UPS system includes a plurality of UPS apparatuses, and the non-current equalization UPS apparatus may be any UPS apparatus in the parallel UPS system. In the parallel UPS system, the non-current equalization UPS apparatus may be correspondingly connected to a first battery string, to implement the current distribution method provided in any implementation of the first aspect. For a technical effect of a corresponding solution in the second aspect, refer to a technical effect that can be achieved in a corresponding solution in the first aspect. Repeated content is not described in detail again. For example, a control module may obtain a capacity proportion of an available battery capacity of a first battery string in a total available battery capacity of the plurality of battery strings when each of the plurality of UPS apparatuses supplies power by using a battery string correspondingly connected to the UPS apparatus. The control module may further control, based on the capacity proportion, a power module to output a first current to a load. A current proportion of the first current in a total output current of the parallel UPS system is positively related to the capacity proportion.

For example, when controlling the power module to output the first current to the load based on the capacity proportion, the control module may calculate, based on the capacity proportion and the total output current, a first current value corresponding to the non-current equalization UPS apparatus. The first current value is equal to a product of the capacity proportion and a current value of the total output current. Further, the control module may control, based on the first current value, the power module to output the first current.

When the first current value is less than a current value of a rated output current of the non-current equalization UPS apparatus, the control module may control the current value of the first current to be a second current value, where the second current value is not greater than the current value of the rated output current and is not less than the first current value. When the first current value is the current value of the rated output current, the control module may control the current value of the first current to be the current value of the rated output current. When the first current value is greater than the current value of the rated output current of the non-current equalization UPS apparatus, the control module may control the current value of the first current to be a third current value, where the third current value is not greater than the current value of the rated output current of the non-current equalization UPS apparatus.

To maintain the total output current of the parallel UPS system, when the first current value is greater than the current value of the rated output current of the non-current equalization UPS apparatus, the control module may further control a communication module to send indication information to a second UPS apparatus. The indication information indicates a difference obtained by subtracting the third current value from the first current value. The second UPS apparatus may be any UPS apparatus other than the non-current equalization UPS apparatus in the plurality of UPS apparatuses in the parallel UPS system.

To maintain the total output current of the parallel UPS system, when the first current value is less than the current value of the rated output current of the non-current equalization UPS apparatus, after the communication module receives indication information sent by any other UPS apparatus, the control module may further control, based on the received indication information, the current value of the first current of the non-current equalization UPS apparatus to be a second current value, where the second current value is a sum of the first current value and a difference indicated by the indication information.

In this embodiment of this application, when obtaining the capacity proportion of the first battery string, the control module may control the communication module to send first query information to another UPS apparatus different from the non-current equalization UPS apparatus in the plurality of UPS apparatuses. The first query information is used to indicate the another UPS apparatus to feed back an available battery capacity of a battery string correspondingly connected to the another UPS apparatus. The control module may further obtain the capacity proportion based on the available battery capacity of the first battery string and the available battery capacity of the battery string correspondingly connected to the another UPS apparatus.

It can be understood that, after the communication module receives first query information sent by any other UPS apparatus different from the non-current equalization UPS apparatus, the control module may further control the communication module to feed back the available battery capacity of the first battery string to the any other UPS apparatus.

In an embodiment, after the first battery string starts to be used to supply power, the control module may further control the communication module to send second query information to another UPS apparatus different from the non-current equalization UPS apparatus, where the second query information may indicate the another UPS apparatus to feed back a current power supply status. When all other UPS apparatuses supply power by using battery strings, the control module may determine that each of the plurality of UPS apparatuses supplies power by using a battery string correspondingly connected to the UPS apparatus.

In addition, when at least one other UPS apparatus does not supply power by using a battery string correspondingly connected to the at least one other UPS apparatus, the control module may further control the power module to output a second current to the load. The second current is not greater than the rated output current of the non-current equalization UPS apparatus.

It can be understood that, after the communication module receives second query information sent by any other UPS apparatus different from the non-current equalization apparatus, the control module may further control the communication module to feed back a current power supply status to the any other UPS apparatus.

According to a third aspect, an embodiment of this application further provides a parallel UPS system. The parallel UPS system includes the plurality of non-current equalization UPS apparatuses provided in any implementation of the second aspect and a plurality of battery strings, and the plurality of non-current equalization UPS apparatuses are correspondingly connected to the plurality of battery strings. Each battery string is configured to supply power to a non-current equalization UPS apparatus correspondingly connected to the battery string.

According to a fourth aspect, an embodiment of this application further provides a computer-readable storage medium. The computer-readable storage medium stores instructions. When the instructions are run on a computer, the computer is enabled to perform the methods according to the foregoing aspects.

According to a fifth aspect, an embodiment of this application further provides a computer program product including instructions. When the computer program product runs on a computer, the computer is enabled to perform the methods according to the foregoing aspects.

These aspects or other aspects of this application are clearer and easier to understand in descriptions of the following embodiments.

BRIEF DESCRIPTION OF DRAWINGS

FIG. 2 is a diagram of an architecture of a parallel UPS system;

FIG. 3 is a flowchart of a current distribution method according to an embodiment of this application;

DESCRIPTION OF EMBODIMENTS

To make the objectives, technical solutions, and advantages of this application clearer, the following further describes this application in detail with reference to the accompanying drawings. An operation in a method embodiment may also be applied to an apparatus embodiment or a system embodiment. It should be noted that, in description of this application, "at least one" means one or more, and "a plurality of" means two or more. In view of this, "a plurality of" may also be understood as "at least two" in embodiments of this application. The term "and/or" describes an association between associated objects and indicates that three relationships may exist. For example, A and/or B may indicate the following three cases: Only A exists, both A and B exist, and only B exists. In addition, the character "/" generally indicates an "or" relationship between the associated objects unless otherwise stated. In addition, it should be understood that in the descriptions of this application, terms such as "first" and "second" are merely used for distinguishing and description, but should not be understood as indicating or implying relative importance, or should not be understood as indicating or implying a sequence. In embodiments of this application, a relative magnitude relationship between currents is equivalent to a relative magnitude relationship between current values. For example, that a current 1 is greater than a current 2 may also be expressed as that a current value of the current 1 is greater than a current value of the current 2.

In modern society, a large quantity of devices as small as household appliances or as large as data centers and factory production lines operate depending on electric power. Electric power supply has become one of factors for maintaining normal functioning of the modern society. Therefore, a large-scale power grid is constructed for a country, and electric energy produced by a power plant may be transmitted, through the power grid, to a device that requires electric power for operating.

However, the power grid may be subject to a risk of power interruption. When power interruption occurs on the power grid, the device may be damaged, and use experience of people is also affected. For example, when a data center encounters a sudden power failure, important data may be lost. When an electric lamp encounters a sudden power failure, night lighting for people may be affected, thereby causing inconvenience to people's life.

Figure 1:
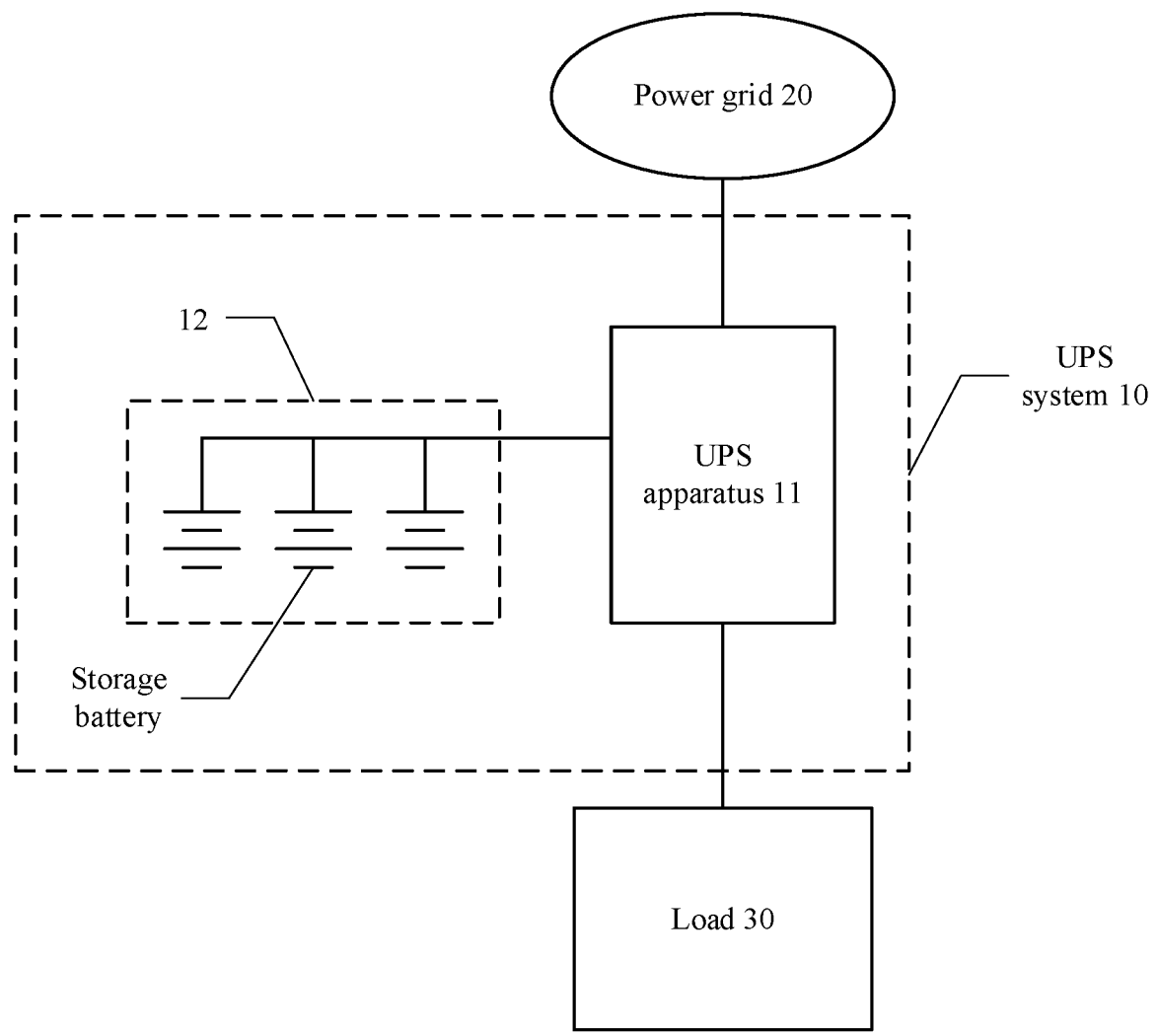
FIG. 1 is a diagram of an architecture of a UPS system.

In view of this, a UPS system has been increasingly widely used. FIG. 1 is an example diagram of an architecture of a UPS system 10. As shown in FIG. 1, the UPS system 10 mainly includes a UPS apparatus 11 and a battery string 12. The UPS apparatus 11 is separately connected to a power grid 20, a load 30, and the battery string 12.

The power grid 20 may be an urban power grid, a photovoltaic power grid, a microgrid, a residential power grid, an industrial power grid, or the like. The power grid 20 may continuously supply power to the UPS apparatus 11. There are a plurality of possibilities of electric energy supplied by the power grid 20 to the UPS apparatus 11. For example, the electric energy may be alternating-current power or direct-current power, may be high-frequency alternating-current power or low-frequency alternating-current power, or may be high-voltage power or low-voltage power. The electric energy supplied by the power grid 20 to the UPS apparatus 11 is mainly determined by a type of the power grid 20. This is not further limited in this embodiment of this application.

When the power grid 20 keeps supplying power, the UPS apparatus 11 may supply power to the load 30 by using the electric energy supplied by the power grid 20. In an embodiment, the power grid 20 may directly forward, to the load 30, the electric energy supplied by the power grid 20. For example, the power grid 20 inputs 220 V and 50 Hz alternating-current power into the UPS apparatus 11. In this case, the UPS apparatus 11 also outputs 220 V and 50 Hz alternating-current power to the load 30.

In another embodiment, the UPS apparatus 11 may alternatively convert the electric energy supplied by the power grid 20, for example, in one or more of the following conversion manners: rectifier conversion, inverter conversion, boost conversion, and buck conversion, to output electric energy adapting to the load 30. For example, if the power grid 20 inputs alternating-current electric energy into the UPS apparatus 11 and the load 30 is a direct-current load, the UPS apparatus 11 may perform rectifier conversion on the alternating-current electric energy supplied by the power grid 20 to convert the alternating-current electric energy into direct-current electric energy, and then supply the direct-current electric energy to the load 30. If a voltage of the direct-current energy obtained through rectifier conversion is high and the load 30 is a low-voltage direct-current load, the UPS apparatus 11 may further perform buck conversion on the direct-current electric energy to obtain low-voltage direct-current electric energy, and then supply the low-voltage direct-current electric energy to the load 30.

The load 30 operates by using the electric energy supplied by the UPS apparatus 11. It should be understood that there may be different implementations of the load 30 based on variations of application scenarios. For example, the load 30 may be a household appliance, such as a refrigerator, a washing machine, an air conditioner, or an electric lamp. In this case, the power grid 20 may be a residential power grid, and the UPS system 10 may uninterruptedly supply power to the household appliance.

For another example, the load 30 may be a community. In this case, the power grid 20 may be an urban power grid, and the UPS system 10 may uninterruptedly supply power to all residents in the community. For another example, the load 30 may be a data center. In this case, the power grid 20 may be an industrial power grid, and the UPS system 10 may uninterruptedly supply power to the data center. There are a plurality of possibilities of application scenarios of the UPS system 10, and the application scenarios are not described one by one.

In a period during which the power grid 20 keeps supplying power, the UPS apparatus 11 may continuously monitor a power supply status of the power grid 20. When a power failure occurs on the power grid 20, the UPS apparatus 11 may continue to supply power to the load 30 by using electric energy supplied by the battery string 12. It should be noted that, that "a power failure occurs on the power grid 20" should be understood as a case in which the UPS apparatus 11 cannot receive normal electric energy from the power grid 20. For example, the UPS apparatus 11 does not receive electric energy from the power grid 20, or a voltage sag occurs in electric energy supplied by the power grid 20 (a voltage input by the power grid 20 is 15% to 20% lower than a nominal voltage for seconds), or a surge occurs in electric energy supplied by the power grid 20 (a voltage input by the power grid 20 is more than 10% higher than a nominal voltage for seconds), or severe interference exists in electric energy supplied by the power grid 20. All these abnormalities may be understood as that "a power failure occurs on the power grid 20".

When continuing to supply power to the load 30 by using the electric energy supplied by the battery string 12, the UPS apparatus 11 may directly forward, to the load 30, the electric energy supplied by the battery string 12; or may convert the electric energy supplied by the battery string 12, for example, in one or more of the following conversion manners: inverter conversion, boost conversion, and buck conversion, to output electric energy adapting to the load 30. For example, the load 30 is an alternating-current load, and the UPS apparatus 11 may perform inverter conversion on direct-current electric energy supplied by the battery string 12, to obtain alternating-current electric energy, and supply the alternating-current electric energy to the load 30.

As shown in FIG. 1, the battery string 12 may include a plurality of batteries. That the battery string 12 supplies power to the UPS apparatus 11 may be understood as that the plurality of batteries output electric energy to the UPS apparatus 11 in parallel. Generally, the batteries in the battery string 12 may be storage batteries. In a period during which the power grid 20 keeps supplying power, the UPS apparatus 11 may charge the battery string 12 by using the electric energy supplied by the power grid 20. When a power failure occurs on the power grid 20, the battery string 12 may release stored electric energy to the UPS apparatus 11, so that the UPS apparatus 11 may keep uninterruptedly supplying power to the load 30.

While supplying power by using the battery string 12, the UPS apparatus 11 may also continuously monitor a power supply status of the power grid 20. After the power grid 20 recovers and starts to supply power again, the UPS apparatus 11 may switch to the power grid 20 for power supply, and continue to supply power to the load 30 by using electric energy supplied by the power grid 20. In addition, the battery string 12 may be further charged by using the electric energy supplied by the power grid 20.

It can be learned from the foregoing content that the UPS apparatus 11 may still keep uninterruptedly supplying power to the load 30 when a power supply status of the power grid 20 changes. However, because application scenarios of the UPS system 10 become increasingly complex, an operating power of the load 30 also gradually increases. For example, when the load 30 is a high-power load such as an industrial park or a large data center, an output power of only one UPS apparatus usually cannot drive the load 30 to operate. In view of this, an increasing quantity of high-power loads 30 adapt to a parallel UPS system.

For example, as shown in FIG. 2, a parallel UPS system 40 is a UPS system capable of driving a high-power load 30. The parallel UPS system 40 includes a plurality of UPS apparatuses (a UPS apparatus 11-1, a UPS apparatus 11-2, . . . , and a UPS apparatus 11-N, where N is an integer greater than 1) and a plurality of battery strings (a battery string 12-1, a battery string 12-2, . . . , and a battery string 12-N). The plurality of UPS apparatuses and the plurality of battery strings in the parallel UPS system 40 are correspondingly connected. For example, the UPS apparatus 11-1 is connected to the battery string 12-1, the UPS apparatus 11-2 is connected to the battery string 12-2, . . . , and the UPS apparatus 11-N is connected to the battery string 12-N.

The plurality of UPS apparatuses in the parallel UPS system 40 are further connected to the power grid 20 and the load 30. When the power grid 20 keeps supplying power, the plurality of UPS apparatuses may jointly supply power to the load 30 by using electric energy supplied by the power grid 20, thereby increasing an overall output power of the parallel UPS system 40, and further driving the load 30 to operate.

When a power failure occurs on the power grid 20, each of the plurality of UPS apparatuses may continue to supply power to the load 30 by using electric energy supplied by a battery string correspondingly connected to the UPS apparatus. A time within which each UPS apparatus can continuously supply power by using a battery string may be referred to as a backup time of the UPS apparatus. For example, when a battery string is started to supply power, an available battery capacity of the battery string 12-1 is 12 A·h, and a battery current is 2 A. In this case, a backup time of the UPS apparatus 11-1 is 6 h.

It can be understood that, in the parallel UPS system 40, the plurality of UPS apparatuses need to simultaneously supply power to the load 30 to drive the load 30 to operate. Therefore, when the plurality of UPS apparatuses simultaneously supply power by using battery strings, a system backup time of the parallel UPS system 40 is mainly limited by a UPS apparatus with a shortest backup time.

However, in the current parallel UPS system 40, current distribution is performed on each UPS apparatus in a current equalization manner. Even if the load 30 is evenly distributed among the plurality of UPS apparatuses in the parallel UPS system 40, this may be understood as that the plurality of UPS apparatuses may output output-currents of a same magnitude. An output current of each UPS apparatus is obtained by the UPS apparatus by converting a battery current of a battery string correspondingly connected to the UPS apparatus. Usually, when the plurality of UPS apparatuses output output-currents of a same magnitude, the plurality of battery strings in the parallel UPS system 40 may also have battery currents of a same magnitude, and output powers of the plurality of battery strings are the same. Therefore, when all the plurality of UPS apparatuses supply power by using battery strings, a system backup time of the parallel UPS system 40 is mainly determined by a battery string with a smallest available battery capacity.

For example, in FIG. 2, battery currents of the UPS apparatus 11-1 to the UPS apparatus 11-N are all 2 A. At an initial time point at which a power failure occurs on the power grid 20, all the UPS apparatus 11-1 to the UPS apparatus 11-N switch to battery strings for power supply. In this case, an available battery capacity of the battery string 12-2 is the smallest, and is only 10 A·h. Therefore, an overall system backup time of the parallel UPS system 40 is 5 h. After 5 h, the parallel UPS system 40 cannot continue to supply, to the load 30, electric energy that is sufficient for driving the load 30 to operate.

It should be noted that the "available battery capacity" in this embodiment of this application is a battery capacity that can be used in a battery string. In a discharge process of a battery string, an actual battery capacity of the battery string gradually decreases. A cut-off capacity is set for some battery strings. When an actual battery capacity of a battery string decreases to the cut-off capacity, the battery string cannot continue to output electric energy. In this case, the "available battery capacity" in this embodiment of this application may be understood as a difference between an actual battery capacity and a cut-off capacity of a battery string.

In the current parallel UPS system 40, because the current distribution manner based on current equalization is used, a resource waste is caused to a battery string with a large available battery capacity, and further extension of the system backup time of the parallel UPS system 40 is also limited. For example, in the foregoing example, an available battery capacity of the battery string 12-1 at the initial time point is 12 A·h, and an available battery capacity of the battery string 12-2 at the initial time point is 10 A·h. After the system backup time of the parallel UPS system 40 elapses, 2 A·h of the available battery capacity of the battery string 12-1 remains.

In view of this, an embodiment of this application provides a new current distribution method, to perform current distribution on each UPS apparatus based on an available battery capacity of each battery string. Compared with the current distribution manner based on current equalization, magnitudes of battery currents of some UPS apparatuses can be reduced (available battery capacities of battery strings corresponding to the UPS apparatuses are small at the initial time point), to extend backup times of the UPS apparatuses, and further extend the system power backup time of the parallel UPS system 40.

In addition, magnitudes of battery currents of other UPS apparatuses can also be increased (available battery capacities of battery strings corresponding to the other UPS apparatuses are large at the initial time point), to maintain an output power of the parallel UPS system 40 and fully utilize resources of the battery strings corresponding to the other UPS apparatuses.

For example, the current distribution method provided in this embodiment of this application may be used in any UPS apparatus in the parallel UPS system 40. The UPS apparatus 11-1 is used as an example below to further describe the current distribution method provided in this embodiment of this application. It should be understood that the current distribution method may also be applied to another UPS apparatus different from the UPS apparatus 11-1 in the parallel UPS system 40. Details are not described in this embodiment of this application.

As shown in FIG. 3, the current distribution method provided in this embodiment of this application mainly includes the following steps.

S301: When each of the plurality of UPS apparatuses supplies power by using a battery string correspondingly connected to the UPS apparatus, the UPS apparatus 11-1 may obtain a capacity proportion of an available battery capacity of the battery string 12-1 in a total available battery capacity of the plurality of battery strings.

The UPS apparatus 11-1 may perform S301 at any time point at which each of the plurality of UPS apparatuses supplies power by using a battery string correspondingly connected to the UPS apparatus. For example, S301 may be performed at an initial time point at which each of the plurality of UPS apparatuses starts to supply power by using a battery string correspondingly connected to the UPS apparatus, or S301 may be performed at any time point after the initial time point in a period during which each of the plurality of UPS apparatuses supplies power by using a battery string correspondingly connected to the UPS apparatus.

For example, in a period from a time point t1 to a time point t2, all the UPS apparatus 11-1 to the UPS apparatus 11-N in the parallel UPS system 40 supply power by using battery strings. Therefore, in this embodiment of this application, a time point at which the UPS apparatus 11-1 performs S301 may be the time point t1, or may be the time point t2, or may be any time point between the time point t1 and the time point t2. The time point t1 may be understood as the initial time point.

For ease of understanding, in this embodiment of this application, a first time point is used to represent the time point at which the UPS apparatus 11-1 performs S301. It can be understood that there may be one or more first time points in the period from t1 to t2. The UPS apparatus 11-1 may perform the current distribution method shown in FIG. 3 one or more times. This is not further limited in this embodiment of this application.

In this embodiment of this application, the available battery capacity of the battery string 12-1 may be understood as a battery capacity of the battery string 12-1 at the first time point (or at a time point close to the first time point). Similarly, the total available battery capacity of the plurality of battery strings may also be understood as a sum of available battery capacities of the battery strings 12-1 to 12-N at the first time point (or at a time point close to the first time point).

For example, it is assumed that the parallel UPS system 40 includes the UPS apparatus 11-1, the UPS apparatus 11-2, and the UPS apparatus 11-3. At the time point t1, an available battery capacity of the battery string 12-1 is 10 A·h, an available battery capacity of the battery string 12-2 is 20 A·h, and an available battery capacity of the battery string 12-3 is 30 A·h. In this case, it can be learned that the capacity proportion of the available battery capacity of the battery string 12-1 in the total available battery capacity is ⅙.

In an embodiment, the UPS apparatus 11-1 may separately send first query information to the UPS apparatus 11-2 to the UPS apparatus 11-N. The first query information may indicate a UPS apparatus that receives the first query information to feed back an available battery capacity of a battery string correspondingly connected to the UPS apparatus.

After receiving the first query information sent by the UPS apparatus 11-1, the UPS apparatus 11-2 may feed back an available battery capacity of the battery string 12-2 to the UPS apparatus 11-1. After receiving the first query information sent by the UPS apparatus 11-1, the UPS apparatus 11-N may feed back an available battery capacity of the battery string 12-N to the UPS apparatus 11-1.

The UPS apparatus 11-N may further obtain the total available battery capacity of the N battery strings based on the available battery capacity of the battery string 12-1 and the available battery capacities of the battery string 12-2 to the battery string 12-N that are fed back by the UPS apparatus 11-2 to the UPS apparatus 11-N respectively, to obtain the capacity proportion of the battery string 12-1.

It can be understood that the UPS apparatus 11-1 may also receive first query information sent by another UPS apparatus. After receiving the first query information sent by the another UPS apparatus, the UPS apparatus 11-1 may feed back the available battery capacity of the battery string 12-1 to the UPS apparatus that sends the first query information.

In another embodiment, each UPS apparatus may further periodically broadcast an available battery capacity of a battery string correspondingly connected to the UPS apparatus. The UPS apparatus 11-1 may obtain the capacity proportion of the battery string 12-1 based on available battery capacities of the battery string 12-2 to the battery string 12-N that are broadcast by the UPS apparatus 11-2 to the UPS apparatus 11-N respectively.

S302: The UPS apparatus 11-1 outputs a first current to a load based on the capacity proportion, where a current proportion of the first current in a total output current of the parallel UPS system 40 is positively related to the capacity proportion.

A larger capacity proportion of the battery string 12-1 indicates a larger current proportion of the first current output by the UPS apparatus 11-1 in the total output current of the parallel UPS system 40. On the contrary, a smaller capacity proportion of the battery string 12-1 indicates a smaller current proportion of the first current output by the UPS apparatus 11-1 in the total output current of the parallel UPS system 40. Cases of the UPS apparatus 11-2 to the UPS apparatus 11-N are similar. Details are not described again.

Therefore, with the current distribution method provided in this embodiment of this application, current distribution may be performed on each UPS apparatus based on an available battery capacity of a battery string correspondingly connected to the UPS apparatus. Therefore, a UPS apparatus correspondingly connected to a battery string with a small available battery capacity may output a small output current, that is, have a small output power. Therefore, the battery string correspondingly connected to the UPS apparatus may also have a small output power, thereby extending a system backup time of the parallel UPS system. A UPS apparatus correspondingly connected to a battery string with a large available battery capacity may output a large output current, that is, have a large output power. Therefore, the battery string correspondingly connected to the UPS apparatus may also have a large output power, thereby maintaining the total output current of the parallel UPS system and fully utilizing resources of the battery string with a large available battery capacity.

The current distribution method provided in this embodiment of this application is further described by using the following examples.

The current proportion of the first current in the total output current of the parallel UPS system 40 is equal to the capacity proportion of the available battery capacity of the battery string 12-1 in the total available battery capacity of the plurality of battery strings. For example, if the capacity proportion of the battery string 12-1 is $2/5$, a proportion of the first current output by the UPS apparatus 11-1 in the total output current of the parallel UPS system is also $2/5$.

This embodiment of this application helps extend a system backup time and improve resource utilization of a battery string with a large available battery capacity. An example is as follows: It is assumed that the parallel UPS system 40 includes two UPS apparatuses: the UPS apparatus 11-1 and the UPS apparatus 11-2; the battery string 12-1 correspondingly connected to the UPS apparatus 11-1; and the battery string 12-2 correspondingly connected to the UPS apparatus 11-2. The capacity proportion of the battery string 12-1 is $2/5$, and a capacity proportion of the battery string 12-2 is $3/5$. That is, a ratio of the available battery capacity of the battery string 12-1 to the available battery capacity of the battery string 12-2 is 2:3.

Figure 4A:
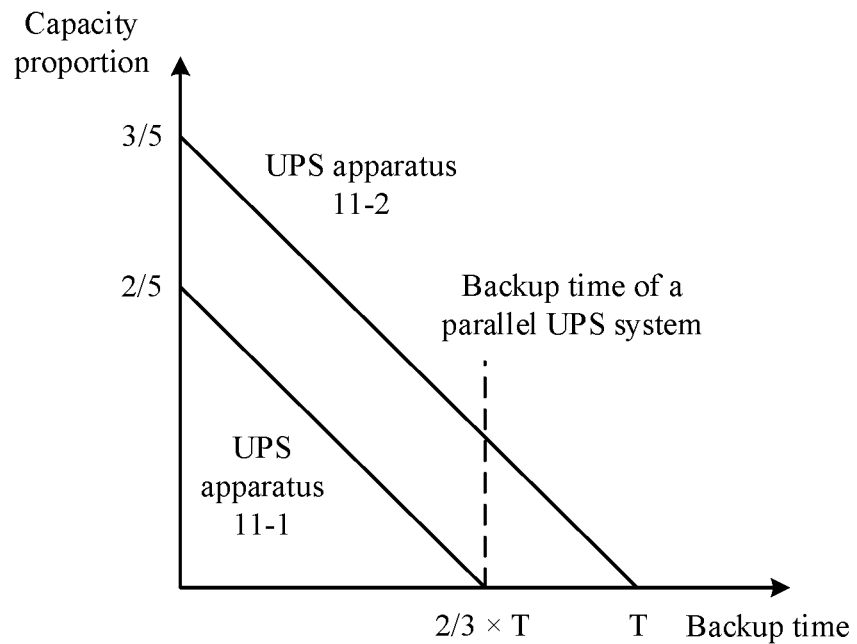
FIG. 4a is a diagram of a system backup time when a current equalization solution is used.

As shown in FIG. 4a, when the current distribution manner based on current equalization is used, output powers of the UPS apparatus 11-1 and the UPS apparatus 11-2 are the same. It is assumed that the output powers are both P/2, where P is the total output power. A backup time of the UPS apparatus 11-2 is T. A duration in which the UPS apparatus 11-2 can continuously discharge is T. In this case, a backup time of the UPS apparatus 11-1 is $2/3 \times T$. A duration in which the UPS apparatus 11-1 can continuously discharge is $2/3 \times T$. Therefore, the system backup time of the parallel UPS system 40 is $2/3 \times T$.

Figure 4B:
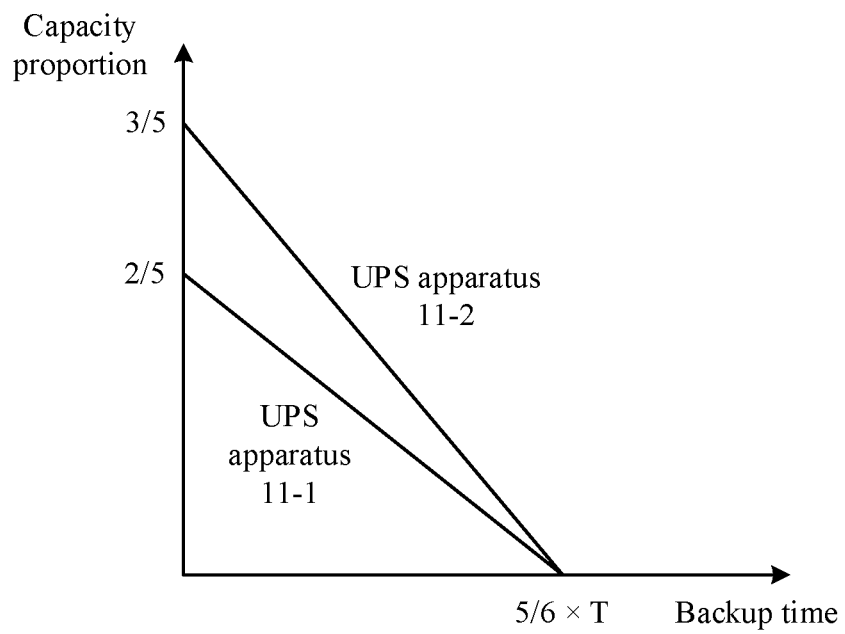
FIG. 4b is a diagram of a system backup time after a current distribution method according to an embodiment of this application is used.

After the current distribution method provided in this embodiment of this application is used, a first current output by the UPS apparatus 11-1 is $2/5 \times I$, and a first current output by the UPS apparatus 11-2 is $3/5 \times I$. That is, an output power of the UPS apparatus 11-1 is $2/5 \times P$, and an output power of the UPS apparatus 11-2 is $3/5 \times P$. In this case, as shown in FIG. 4b, the backup time of the UPS apparatus 11-1 may be prolonged to $5/6 \times T$. In addition, the backup time of the UPS apparatus 11-2 may be reduced to $5/6 \times T$. Therefore, the system backup time of the parallel UPS system 40 may be prolonged to $5/6 \times T$.

Compared with the current distribution manner based on current equalization (as shown in FIG. 4a), in this embodiment of this application, the backup time of the parallel UPS system 40 may be increased by 25%. In addition, after the system backup time elapses, the available battery capacities of the battery string 12-1 and the battery string 12-2 may be exhausted, so that resources of the battery strings can be fully utilized.

To protect safety of the UPS apparatus 11-1, the first current output by the UPS apparatus 11-1 should not exceed a rated output current of UPS apparatus 11-1. In view of this, in an embodiment, the UPS apparatus 11-1 may further first determine a first current value of the UPS apparatus 11-1 based on the capacity proportion of the battery string 12-1, and then output the first current based on the first current value. The first current value is equal to a product of the capacity ratio and a current value of the total output current.

A relative magnitude relationship between the first current value and the current value of the rated output current of the UPS apparatus 11-1 mainly has the following three cases.

Case 1: The first current value is equal to the current value of the rated output current.

In this case, the UPS apparatus 11-1 may use the first current value (that is, the current value of the rated output current) as a current value of the first current.

Case 2: The first current value is greater than the current value of the rated output current.

In this case, the UPS apparatus 11-1 may use a third current value as a current value of the first current. A third current value is not greater than the current value of the rated output current of the UPS apparatus 11-1. For example, if the first current value is 3 A and the current value of the rated output current is 2 A, the UPS apparatus 11-1 may use the third current value as the current value of the first current. The third current value may be 2 A or any current value less than 2 A.

In an embodiment, the UPS apparatus 11-1 may further send indication information to any UPS apparatus other than the UPS apparatus 11-1. The indication information may indicate a difference obtained by subtracting the third current value from the first current value. In the foregoing example, assuming that the third current value is 2 A, the indication information may indicate the difference obtained by subtracting the third current value from the first current value, that is, 1 A.

The UPS apparatus that receives the indication information may increase a current value of a first current of the UPS apparatus based on the indication information, to keep the current value of the total output current unchanged. An example is shown in the following Table 1. It is assumed that the parallel UPS system 40 includes two UPS apparatuses: the UPS apparatus 11-1 and the UPS apparatus 11-2, and the current value of the total output current is 45 A. A ratio of an available battery capacity of the battery string 12-1 to an available battery capacity of the battery string 12-2 is 3:2. That is, a capacity proportion of the battery string 12-1 is ⅗, and a capacity proportion of the battery string 12-2 is ⅖.

In this case, the UPS apparatus 11-1 may determine that the first current value is 27 A, and the UPS apparatus 11-2 may determine that a first current value is 18 A. Assuming that current values of rated output currents of the UPS apparatus 11-1 and the UPS apparatus 11-2 are both 25 A, the UPS apparatus 11-1 may determine that the third current value is 25 A, that is, the current value of the first current is 25 A.

In addition, the UPS apparatus 11-1 may further send indication information to the UPS apparatus 11-2. The indication information may indicate the difference 2 A obtained by subtracting the third current value from the first current value in the UPS apparatus 11-1. The UPS apparatus 11-2 may further determine, based on a sum of the difference indicated by the indication information and the first current value of the UPS apparatus 11-2, that a second current value is a current value of a first current of the UPS apparatus 11-2. In the foregoing example, the UPS apparatus 11-2 may determine that the second current value is 18+2=20 A. The UPS apparatus 11-2 outputs a first current whose current value is 20 A.

Compared with the current distribution solution based on current equalization, the system backup time of the parallel UPS system 40 can also be prolonged in Example 2 provided in this embodiment of this application. When the current value of the total output current is 45 A, if the current distribution solution based on current equalization is used, output currents of the UPS apparatus 11-1 and the UPS apparatus 11-2 are both 22.5 A.

However, after the technical solution provided in this embodiment of this application is used, the UPS apparatus 11-1 may output a first current of 25 A, and the UPS apparatus 11-2 may output a first current of 20 A. Compared with the current distribution solution based on current equalization, in Example 2, an output current of the UPS apparatus 11-1 is increased, and an output current of the UPS apparatus 11-2 is reduced, thereby increasing a battery current of the battery string 12-1, and reducing a battery current of the battery string 12-2.

In addition, because a battery capacity of the battery string 12-2 is small, reducing the battery current of the battery string 12-2 helps extend the system backup time of the parallel UPS system 40. In addition, increasing the battery current of the battery string 12-1 can further reduce a remaining available battery capacity of the battery string 12-1 after the system backup time elapses, thereby helping improve resource utilization of the battery string 12-2. To sum up, with the current distribution solution provided in Example 2 of this application, the system backup time can be prolonged, resource utilization of a battery string with a large available battery capacity can be improved, and safety of a UPS apparatus can also be protected.

Case 3: The first current value is less than the current value of the rated output current.

In this case, the UPS apparatus 11-1 may control a current value of the first current to be a second current value. The second current value is not greater than the current value of the rated output current of the UPS apparatus 11-1 and is not less than the first current value.

In an embodiment, the UPS apparatus 11-1 may use the first current value as the current value of the first current, that is, the first current value is equal to the second current value.

In another embodiment, the UPS apparatus 11-1 may also receive indication information sent by any other UPS apparatus, and control, based on the first current value and a difference value indicated by the indication information, the current value of the first current to be the second current value. Similar to that of the UPS apparatus 11-2 in the case 2, it is assumed that the first current value of the UPS apparatus 11-1 is 18 A and the current value of the rated output current is 25 A. If the difference indicated by the indication information received by the UPS apparatus 11-1 is 2 A, the UPS apparatus 11-1 may determine that the second current value is 20 A, that is, the UPS apparatus 11-1 outputs a first current whose current value is 20 A.

It should be noted that, to protect safety of the UPS apparatus 11-1, the second current value should not exceed the current value of the rated output current of the UPS apparatus 11-1 either. When the parallel UPS system 40 includes more than two UPS apparatuses, indication information may be sent between the UPS apparatuses based on a preset transmission relationship. For example, the UPS apparatus 11-2 may send indication information to the UPS apparatus 11-1, and the UPS apparatus 11-1 may send indication information to the UPS apparatus 11-N.

In this case, if the second current value of the UPS apparatus 11-1 exceeds the current value of the rated output current of the UPS apparatus 11-1, the UPS apparatus 11-1 may send a difference between the second current value and the rated output current to the UPS apparatus 11-N by using indication information, and output the rated output current.

It can be understood that, in a scenario in which the parallel UPS system 40 includes the UPS apparatus 11-1 and the UPS apparatus 11-2, a sum of current values of rated output currents of the UPS apparatus 11-1 and the UPS apparatus 11-2 is not less than a maximum total output current of the parallel UPS system 40.

Based on the case 2 and the case 3, it can be learned that Example 2 and Example 3 provided in this embodiment of this application may meet the following formula:

$$(I1:I2) = k(A1:A2), \text{ where}$$

I1 indicates the current value of the first current of the UPS apparatus 11-1, I2 indicates the current value of the first current of the UPS apparatus 11-2, A1 indicates the available battery capacity of the battery string 12-1, A2 indicates the available battery capacity of the battery string 12-2, and k is an adjustment and current equalization coefficient.

When the first current value of the UPS apparatus 11-1 is greater than the current value of the rated output current of the UPS apparatus 11-1, a value of k is less than 1; when the first current value of the UPS apparatus 11-1 is less than the current value of the rated output current of the UPS apparatus 11-1, a value of k is greater than or equal to 1; or when the first current value of the UPS apparatuses 11-1 is equal to the current value of the rated output current of the UPS apparatuses 11-1, a value of k is equal to 1.

Example 3

In this embodiment of this application, a first time point at which UPS current distribution is performed on the UPS apparatus 11-1 may be an initial time point at which all the plurality of UPS apparatuses supply power by using battery strings correspondingly connected to the UPS apparatuses. The initial time point may be understood as a time point at which all the N UPS apparatuses in the parallel UPS system 40 start to supply power by using battery strings.

There are a variety of factors that cause a power failure on the power grid 20. For example, for the UPS apparatus 11-1, the "power failure on the power grid 20" may be caused by an internal failure of the power grid 20, for example, a transmission line on the power grid 20 is interrupted; or may be caused by an internal failure of the UPS apparatus 11-1, for example, an interface that connects the UPS apparatus 11-1 to the power grid 20 is damaged; or may be caused by factors other than internal failures of the UPS apparatus 11-1 and the power grid 20, for example, the power failure may be alternatively caused by interruption of a connection line between the UPS apparatus 11-1 and the power grid 20. Cases of other UPS apparatuses are similar to that of the UPS apparatus 11-1. Details are not described again.

Each UPS apparatus may switch to a battery string for power supply when a power failure occurs on the power grid 20. However, because factors causing the power failure on the power grid 20 vary, in some scenarios, the N UPS apparatuses in the parallel UPS system 40 do not synchronously switch to battery strings for power supply.

For example, the interface between the UPS apparatus 11-1 and the power grid 20 is damaged, so that a power failure occurs on the power grid 20 for the UPS apparatus 11. Then the UPS apparatus 11-1 switches to the battery string 12-1 for power supply. However, for the UPS apparatus 11-2, the power grid 20 still keeps supplying power. Therefore, the UPS apparatus 11-2 does not switch to the battery string 12-2 for power supply.

In this embodiment of this application, the initial time point is particularly a time point at which each of the N UPS apparatuses starts to supply power by using a battery string. For example, if all UPS apparatuses other than the UPS apparatus 11-1 in the parallel UPS system 40 have switched to battery strings for power supply, a time point at which the UPS apparatus 11-1 switches to a battery string for power supply may be understood as the initial time point.

In view of this, after starting to supply power by using the battery string 12-1, the UPS apparatus 11-1 further needs to first determine whether a current time point is the initial time point. When the current time point is the initial time point, the UPS apparatus 11-1 then obtains the capacity proportion of the battery string 12-1.

For example, after starting to supply power by using the battery string 12-1, the UPS apparatus 11-1 may further send second query information to another UPS apparatus (the UPS apparatus 11-2 to the UPS apparatus 11-N). The second query information may indicate the another UPS apparatus that receives the second query information to feed back a current power supply status.

A current power supply status of a UPS apparatus may be understood as whether the UPS apparatus is currently supplying power by using a battery string. When all other UPS apparatuses (the UPS apparatus 11-2 to the UPS apparatus 11-N) supply power by using battery strings, the UPS apparatus 11-1 may determine that the current time point is the initial time point. Then the UPS apparatus 11-1 may obtain the capacity proportion of the battery string 12-1. A specific implementation is not described in detail again.

In an embodiment, after determining that the current time point is the initial time point, the UPS apparatus 11-1 may further send trigger information to the another UPS apparatus (the UPS apparatus 11-2 to the UPS apparatus 11-N). The UPS apparatus 11-2 is used as an example. After receiving the trigger information, the UPS apparatus 11-2 may determine that the current time point is the initial time point, to obtain the capacity proportion of the battery string 12-2, and perform current distribution based on the capacity proportion.

When at least one other UPS apparatus does not supply power by using a battery string correspondingly connected to the at least one other UPS apparatus, it indicates that the current time point is not the initial time point. In this case, the UPS apparatus 11-1 may output a second current to the load. The second current is not greater than the rated output current of the UPS apparatus 11-1.

For example, a current value of the second current may be equal to a current value of an output current when the UPS apparatus 11-1 supplies power by using the power grid 20. Alternatively, the current value of the second current may be less than the current value of the output current when the UPS apparatus 11-1 supplies power by using the power grid 20, to extend a backup time. In this case, the UPS apparatus 11-1 may further send indication information to a UPS apparatus that still supplies power by using the power grid 20, to indicate the UPS apparatus to increase a current value of an output current, to keep the current value of the total output current unchanged.

It can be understood that the UPS apparatus 11-1 may also receive second query information sent by any other UPS apparatus. After receiving the second query information sent by the any other UPS apparatus, the UPS apparatus 11-1 may further feed back a current power supply status to the UPS apparatus that sends the second query information.

In a period of continuously outputting the second current, the UPS apparatus 11-1 may also receive trigger information sent by any other UPS apparatus. After receiving the trigger information sent by the any other UPS apparatus, the UPS apparatus 11-1 may determine that the current time point is the initial time point, to perform the process shown in FIG. 3.

The foregoing is described from the perspective of method embodiments. It may be understood that, to implement the foregoing method, the UPS apparatus may include a corresponding hardware structure and/or software module for executing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 5:
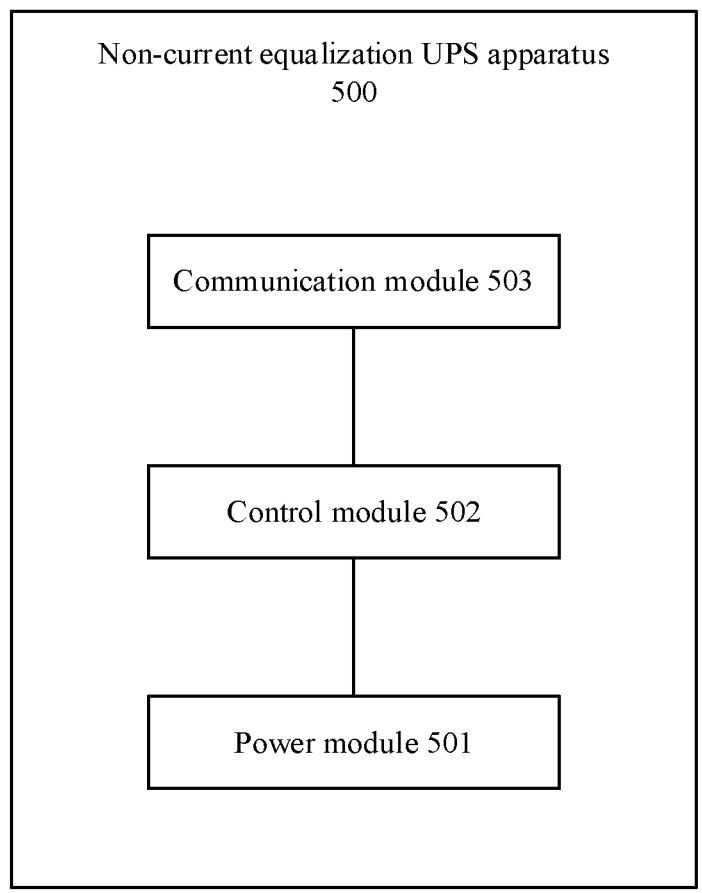
FIG. 5 is a diagram of a structure of a non-current equalization UPS apparatus according to an embodiment of this application.

In view of this, an embodiment of this application further provides a non-current equalization UPS apparatus. The non-current equalization UPS apparatus may be any UPS apparatus in the parallel UPS system 40 shown in FIG. 2. For example, the non-current equalization UPS apparatus 500 provided in this embodiment of this application may mainly include a power module 501 and a control module 502, as shown in FIG. 5. In an embodiment, the non-current equalization UPS apparatus 500 may further include a communication module 503.

The power module 501 is configured to connect to a power grid 20 and a first battery string corresponding to the non-current equalization UPS apparatus 500. Under control of the control module 502, the power module 501 may convert electric energy supplied by the power grid 20 and the first battery string, for example, in one or more of the following conversion manners: rectifier conversion, inverter conversion, boost conversion, and buck conversion, to output electric energy adapting to a load 30.

For example, the power module 501 may include one or more conversion circuits, and convert received electric energy by using the conversion circuit. For example, the power module 501 may include one or more of a plurality of conversion circuits, such as a rectifier conversion circuit, an inverter conversion circuit, a boost conversion circuit, and a buck conversion circuit. Conversion circuits with different functions may exist independently, or may be integrated into one circuit. This is not further limited in this embodiment of this application.

The communication module 503 is configured to exchange information with another UPS apparatus. For example, an information exchange manner that may be used by the communication module 503 includes but is not limited to wireless communication modes such as Bluetooth, wireless broadband (Wi-Fi), the ZigBee protocol, a radio frequency identification (RFID) technology, a long range (Lora) wireless technology, and a near field communication (NFC) technology; or may include wired communication modes such as controller area network (CAN) communication, 485 communication, and fast Ethernet (FE) communication.

The control module 502 may be a processor or a controller, for example, may be a general purpose central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The control module 502 may implement or execute various example logical blocks, modules, and circuits described with reference to content disclosed in this application. The processor may be a combination of processors implementing a computing function, for example, a combination including one or more microprocessors, or a combination of a DSP and a microprocessor.

The non-current equalization UPS apparatus 500 shown in FIG. 5 may implement any current distribution method provided in the foregoing method embodiments of this application. In an embodiment, the control module 502 may obtain a capacity proportion of an available battery capacity of the first battery string in a total available battery capacity of a plurality of battery strings when each of a plurality of UPS apparatuses supplies power by using a battery string correspondingly connected to the UPS apparatus. The control module 502 may further control, based on the capacity proportion, the power module 501 to output a first current to the load. A current proportion of the first current in a total output current of the parallel UPS system is positively related to the capacity proportion.

For example, when controlling, based on the capacity proportion, the power module 501 to output the first current to the load, the control module 502 may calculate, based on the capacity proportion and the total output current, a first current value corresponding to the non-current equalization UPS apparatus 500. The first current value is equal to a product of the capacity proportion and a current value of the total output current. Further, the control module 502 may control, based on the first current value, the power module 501 to output the first current.

When the first current value is less than a current value of a rated output current of the non-current equalization UPS apparatus 500, the control module 502 may control the current value of the first current to be a second current value, where the second current value is not greater than the current value of the rated output current and is not less than the first current value. When the first current value is the current value of the rated output current, the control module 502 may control the current value of the first current to be the current value of the rated output current. When the first current value is greater than the current value of the rated output current of the non-current equalization UPS apparatus 500, the control module 502 may control the current value of the first current to be a third current value, where the third current value is not greater than the current value of the rated output current of the non-current equalization UPS apparatus 500.

To maintain the total output current of the parallel UPS system 40, when the first current value is greater than the current value of the rated output current of the UPS apparatus 500, the control module 502 may further control the communication module 503 to send indication information to a second UPS apparatus. The indication information indicates a difference obtained by subtracting the third current value from the first current value. The second UPS apparatus may be any UPS apparatus other than the non-current equalization UPS apparatus 500 in the plurality of UPS apparatuses in the parallel UPS system.

To maintain the total output current of the parallel UPS system 40, when the first current value is less than the current value of the rated output current of the non-current equalization UPS apparatus 500, after the communication module 503 receives indication information sent by any other UPS apparatus, the control module 502 may further control, based on the received indication information, the current value of the first current to be a second current value, where the second current value is a sum of the first current value and a difference indicated by the indication information.

In this embodiment of this application, when obtaining the capacity proportion of the first battery string, the control module 502 may control the communication module 503 to send first query information to another UPS apparatus different from the non-current equalization UPS apparatus 500 in the plurality of UPS apparatuses. The first query information is used to indicate the another UPS apparatus to feed back an available battery capacity of a battery string correspondingly connected to the another UPS apparatus. The control module 502 may further obtain the capacity proportion based on the available battery capacity of the first battery string and the available battery capacity of the battery string correspondingly connected to the another UPS apparatus.

It can be understood that, after the communication module 503 receives first query information sent by any other UPS apparatus different from the non-current equalization UPS apparatus 500, the control module 502 may further control the communication module 503 to feed back the available battery capacity of the first battery string to the any other UPS apparatus that sends the first query information.

In an embodiment, after the first battery string starts to be used to supply power, the control module 502 may further control the communication module 503 to send second query information to another UPS apparatus different from the non-current equalization UPS apparatus 500, where the second query information may indicate the another UPS apparatus to feed back a current power supply status; and when all other UPS apparatuses supply power by using battery strings, determine that each of the plurality of UPS apparatuses supplies power by using a battery string correspondingly connected to the UPS apparatus.

In addition, when at least one other UPS apparatus does not supply power by using a battery string correspondingly connected to the at least one other UPS apparatus, the control module 502 may further control the power module 501 to output a second current to the load. The second current is not greater than the rated output current of the non-current equalization UPS apparatus 500.

It can be understood that, after the communication module 503 receives second query information sent by any other UPS apparatus different from the non-current equalization apparatus UPS 500, the control module 502 may further control the communication module 503 to feed back a current power supply status to the any other UPS apparatus that sends the second query information.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more procedures in the flowcharts and/or in one or more blocks in the block diagrams.

These computer program instructions may alternatively be stored in a computer-readable memory that can indicate a computer or another programmable data processing device to operate in a specific manner, so that the instructions stored in the computer-readable memory generate an artifact that includes an instruction apparatus. The instruction apparatus implements a function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a function in one or more procedures in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of the following claims of this application and their equivalent technologies.

What is claimed is:

1. A non-current equalization UPS apparatus for a parallel uninterruptible power system (UPS) system including the non-current equalization UPS apparatuses, and including a plurality of battery strings correspondingly connected to the plurality of non-current equalization UPS apparatuses, each non-current equalization UPS apparatus comprising:

a power module configured to connect to a first battery string of the plurality of battery strings; and a control module in communication with the power module, the control module being configured to:

when each non-current equalization UPS apparatus of the plurality of non-current equalization UPS apparatuses supplies power using a corresponding battery string, obtain a capacity proportion of an available battery capacity of the first battery string in a total available battery capacity of the plurality of battery strings;

calculate, based on the capacity proportion and the total output current, a first current value corresponding to the non-current equalization UPS apparatus, wherein the first current value is equal to a product of the capacity proportion and a current value of the total output current; and control, based on the capacity proportion, the power module to output a first current to a load, wherein a current proportion of the first current in a total output current of the parallel UPS system is positively related to the capacity proportion, the controlling comprising:

when the first current value is less than a current value of a rated output current of the non-current equalization UPS apparatus, control the current value of the first current to be a second current value, wherein the second current value is not greater than the current value of the rated output current and is not less than the first current value;

when the first current value is the current value of the rated output current of the non-current equalization UPS apparatus, control the current value of the first current to be the current value of the rated output current; or when the first current value is greater than the current value of the rated output current of the non-current equalization UPS apparatus, control the current value of the first current to be a third current value, wherein the third current value is not greater than the current value of the rated output current of the non-current equalization UPS apparatus.

2. The non-current equalization UPS apparatus according to claim 1, wherein the non-current equalization UPS apparatus further comprises a communication module, and when the first current value is greater than the current value of the rated output current of the non-current equalization UPS apparatus, the control module is further configured to:
control the communication module to send indication information to a second UPS apparatus, wherein the indication information is used to indicate a difference obtained by subtracting the third current value from the first current value, and the second UPS apparatus is another UPS apparatus in the plurality of non-current equalization UPS apparatuses and the second UPS apparatus different from the non-current equalization UPS apparatus in the plurality of non-current equalization UPS apparatuses.

3. The non-current equalization UPS apparatus according to claim 1, wherein the non-current equalization UPS apparatus further comprises a communication module, and when the first current value is less than the current value of the rated output current of the non-current equalization UPS apparatus, the control module is further configured to:
after the communication module receives indication information sent by any other UPS apparatus, control the current value of the first current to be the second current value based on the received indication information, wherein a difference obtained by subtracting the first current value from the second current value is indicated by the indication information.

4. The non-current equalization UPS apparatus according to claim 1, wherein the non-current equalization UPS apparatus further comprises a communication module, and the control module is configured to:
control the communication module to send first query information to another UPS apparatus different from the non-current equalization UPS apparatus, wherein the first query information indicates the another UPS apparatus to feed back an available battery capacity of another battery string connected to the another UPS apparatus; and
obtain the capacity proportion based on the available battery capacity of the first battery string and the available battery capacity of the another battery string connected to the another UPS apparatus.

5. The non-current equalization UPS apparatus according to claim 1, wherein the non-current equalization UPS apparatus further comprises a communication module, and the control module is further configured to:
after the first battery string starts to supply power, control the communication module to send second query information to another UPS apparatus different from the non-current equalization UPS apparatus, wherein the second query information indicates the another UPS apparatus to feed back a current power supply status; and
when all other UPS apparatuses supply power using battery strings, determine that each UPS apparatus of the plurality of UPS apparatuses supplies power using a corresponding battery string.

6. The non-current equalization UPS apparatus according to claim 5, wherein the control module is further configured to:
when at least one other UPS apparatus does not supply power using at least one other battery string corresponding to the at least one other UPS apparatus, control the power module to output a second current to the load, wherein the second current is not greater than the rated output current of the non-current equalization UPS apparatus.

7. The non-current equalization UPS apparatus according to claim 1, wherein the non-current equalization UPS apparatus further comprises a communication module, and the control module is further configured to:
after the communication module receives first query information sent by any other UPS apparatus different from the non-current equalization UPS apparatus, control the communication module to feed back the available battery capacity of the first battery string to the any other UPS apparatus.

8. The non-current equalization UPS apparatus according to claim 1, wherein the non-current equalization UPS apparatus further comprises a communication module, and the control module is further configured to:
after the communication module receives second query information sent by any other UPS apparatus different from the non-current equalization UPS apparatus, control the communication module to feed back a current power supply status to the any other UPS apparatus.

9. A current distribution method for a first UPS apparatus in a parallel UPS system, the parallel UPS system includes a plurality of non-current equalization UPS apparatuses, and a plurality of battery strings correspondingly connected to the plurality of non-current equalization UPS apparatuses, the method comprising:
when each UPS apparatus of the plurality of UPS apparatuses supplies power using a corresponding battery string, obtaining a capacity proportion of an available battery capacity of a first battery string in a total available battery capacity of the plurality of battery strings, wherein the first battery string is a battery string correspondingly connected to the first UPS apparatus;
calculating, based on the capacity proportion and the total output current, a first current value corresponding to the non-current equalization UPS apparatus, wherein the first current value is equal to a product of the capacity proportion and a current value of the total output current; and
outputting a first current to a load based on the capacity proportion, wherein a current proportion of the first current in a total output current of the parallel UPS system is positively related to the capacity proportion, the outputting comprising:
when the first current value is less than a current value of a rated output current of the non-current equalization UPS apparatus, control the current value of the first current to be a second current value, wherein the second current value is not greater than the current value of the rated output current and is not less than the first current value;
when the first current value is the current value of the rated output current of the non-current equalization UPS apparatus, control the current value of the first current to be the current value of the rated output current; or
when the first current value is greater than the current value of the rated output current of the non-current equalization UPS apparatus, control the current value of the first current to be a third current value, wherein the third current value is not greater than the current value of the rated output current of the non-current equalization UPS apparatus.

10. The method according to claim 9, wherein when the first current value is greater than the current value of the rated output current of the first UPS apparatus, the method further comprises:

sending indication information to a second UPS apparatus, wherein the indication information is used to indicate a difference obtained by subtracting the third current value from the first current value, and the second UPS apparatus is another UPS apparatus in the plurality of non-current equalization UPS apparatuses and the second UPS apparatus different from the first UPS apparatus.

11. The method according to claim 9, wherein when the first current value is less than the current value of the rated output current of the first UPS apparatus, the method further comprises:

after indication information sent by any other UPS apparatus is received, controlling the current value of the first current to be the second current value based on the received indication information, wherein a difference obtained by subtracting the first current value from the second current value is indicated by the indication information.

12. The method according to claim 9, wherein the obtaining a capacity proportion of an available battery capacity of a first battery string in a total available battery capacity of the plurality of battery strings comprises:

sending first query information to another UPS apparatus different from the non-current equalization UPS apparatus in the plurality of UPS apparatuses, wherein the first query information indicates the another UPS apparatus to feed back an available battery capacity of another battery string connected to the another UPS apparatus; and obtaining the capacity proportion based on the available battery capacity of the first battery string and the available battery capacity of the another battery string.

13. The method according to claim 9, wherein the method further comprises:

after the first battery string starts to supply power, sending second query information to the another UPS apparatus, wherein the second query information indicates the another UPS apparatus to feed back a current power supply status; and when all other UPS apparatuses supply power using battery strings, determining that each UPS apparatus of the plurality of UPS apparatuses supplies power using a corresponding battery string.

14. The method according to claim 13, wherein after the sending second query information to the another UPS apparatus, the method further comprises:

when at least one other UPS apparatus does not supply power using at least one other battery string corresponding to the at least one other UPS apparatus, outputting a second current to the load, wherein the second current is not greater than the rated output current of the first UPS apparatus.

15. The method according to claim 9, wherein the method further comprises:

after first query information sent by any other UPS apparatus different from the first UPS apparatus is received, feeding back the available battery capacity of the first battery string to the any other UPS apparatus.

16. A parallel UPS system, comprising:

a plurality of UPS apparatuses, including a non-current equalization UPS apparatus; and a plurality of battery strings correspondingly connected to the plurality of non-current equalization UPS apparatuses;

the non-current equalization UPS apparatus comprising:

a power module configured to connect to a first battery string of the plurality of battery strings; and a control module in communication with the power module, the control module being configured to:

when each non-current equalization UPS apparatus of the plurality of UPS apparatuses supplies power using a corresponding battery string, obtain a capacity proportion of an available battery capacity of the first battery string in a total available battery capacity of the plurality of battery strings;

calculate, based on the capacity proportion and the total output current, a first current value corresponding to the non-current equalization UPS apparatus, wherein the first current value is equal to a product of the capacity proportion and a current value of the total output current; and control, based on the capacity proportion, the power module to output a first current to a load, wherein a current proportion of the first current in a total output current of the parallel UPS system is positively related to the capacity proportion, the controlling comprising:

when the first current value is less than a current value of a rated output current of the non-current equalization UPS apparatus, control the current value of the first current to be a second current value, wherein the second current value is not greater than the current value of the rated output current and is not less than the first current value;

when the first current value is the current value of the rated output current of the non-current equalization UPS apparatus, control the current value of the first current to be the current value of the rated output current; or when the first current value is greater than the current value of the rated output current of the non-current equalization UPS apparatus, control the current value of the first current to be a third current value, wherein the third current value is not greater than the current value of the rated output current of the non-current equalization UPS apparatus;

each battery string is configured to supply power to the corresponding non-current equalization UPS apparatus.

* * * * *